(12) United States Patent
Duray

(10) Patent No.: US 7,856,816 B2
(45) Date of Patent: Dec. 28, 2010

(54) HYDRAULIC BRAKE ENERGY REGENERATION SYSTEM FOR ELECTRIC ENERGY STORAGE AND VEHICLE DRIVE ASSIST

(75) Inventor: Vincent Joseph Duray, Edina, MN (US)

(73) Assignee: Eaton Corporation, Cleveland, OH (US)

( * ) Notice: Subject to any disclaimer, the term of this patent is extended or adjusted under 35 U.S.C. 154(b) by 400 days.

(21) Appl. No.: 11/969,066

(22) Filed: Jan. 3, 2008

(65) Prior Publication Data

US 2009/0173066 A1   Jul. 9, 2009

(51) Int. Cl.
F16H 39/00 (2006.01)
B60K 17/10 (2006.01)

(52) U.S. Cl. .................................. 60/414; 180/165
(58) Field of Classification Search .................. 60/413, 60/414, 435; 180/165
See application file for complete search history.

(56) References Cited

U.S. PATENT DOCUMENTS

| | | | |
|---|---|---|---|
| 4,215,545 A * | 8/1980 | Morello et al. | 60/413 |
| 4,534,169 A * | 8/1985 | Hunt | 60/414 |
| 4,815,334 A * | 3/1989 | Lexen | 74/661 |
| 6,119,802 A * | 9/2000 | Puett, Jr. | 180/242 |
| 6,170,587 B1 * | 1/2001 | Bullock | 180/165 |
| 6,719,080 B1 * | 4/2004 | Gray, Jr. | 180/165 |
| 6,971,232 B2 * | 12/2005 | Singh | 60/414 |
| 6,971,463 B2 * | 12/2005 | Shore et al. | 180/165 |
| 2004/0118623 A1 | 6/2004 | Shore et al. | |

FOREIGN PATENT DOCUMENTS

| | | | |
|---|---|---|---|
| DE | 102005060994 | * | 6/2007 |
| DE | 102005060994 A1 | | 6/2007 |
| DE | 102006019535 A1 | | 10/2007 |
| EP | 0253975 A1 | | 1/1988 |
| WO | WO 98/47732 A1 | | 10/1998 |
| WO | WO 2006/055978 A1 | | 5/2006 |

OTHER PUBLICATIONS

English abstract provided for DE102005060994, Jun. 21, 2007.
English abstract provided for DE102006019535, Oct. 31, 2007.
International search report for PCT/US2008/088175, Aug. 10, 2009.

* cited by examiner

Primary Examiner—Thomas E Lazo
(74) Attorney, Agent, or Firm—Rader, Fishman & Grauer PLLC

(57) ABSTRACT

A hydraulic drive system for storing and releasing hydraulic fluid includes a high pressure storage device, a low pressure storage device, a pump operating at a range of pump speeds for converting between mechanical energy and hydraulic energy, and a motor operating at a range of motor speeds for converting between hydraulic energy and mechanical energy. The pump and motor are both fluidly connected to the high and low pressure storage devices. The hydraulic drive system further includes a control valve fluidly connected to the high pressure storage device, the pump and the motor, the control valve being operable to selectively distribute high pressure fluid between the pump, motor and high pressure storage device.

20 Claims, 9 Drawing Sheets

*Vehicle (100) Operation Input:* Braking, Acceleration (Low Torque, Medium Torque, High Torque), Constant Speed, Coasting, Vehicle Stop
*Battery (111):* Full Charge, Not Full Charge
*High Pressure Accumulator (138):* Empty, Partial Pressure, Full Pressure
*Transfer Case (128) Clutch:* Drive Clutch (208) Engaged, Alternator Clutch (209) Engaged, Clutch (208,209) Engaged, Clutch (208,209) Disengaged
*Pump-Motor (130):* No Action, Charge Accumulator (138), Power Hydraulic Motor (119), Power Vehicle (100)
*Swash Plate (216) Angle:* No Displacement, Small Angle (low displacement), Large Angle (high displacement)
*Alternator (115):* No Action, Charge Battery (111)

| Vehicle (100) Operation Input | Battery (111) | High Pressure Accumulator (138) | Transfer Case (128) Clutch |
|---|---|---|---|
| Braking | Not Full Charge | Empty/Partial Pressure | Drive Clutch (208) Engaged |
| Low Torque Acceleration | Not Full Charge | Empty | Clutch (208,209) Disengaged |
| Moderate Torque Accel. | Not Full Charge | Empty | Clutch (208,209) Disengaged |
| High Torque Acceleration | Not Full Charge | Empty | Clutch (208,209) Disengaged |
| Constant Speed | Not Full Charge | Empty | Clutch (208,209) Disengaged |
| Coasting | Not Full Charge | Empty | Clutch (208,209) Disengaged |
| Vehicle Stop | Not Full Charge | Empty | Clutch (208,209) Disengaged |
| Braking | Not Full Charge | Full Pressure | Clutch (208,209) Engaged |
| Low Torque Acceleration | Not Full Charge | Full/Partial Pressure | Clutch (209) Engaged |
| Moderate Torque Accel. | Not Full Charge | Full/Partial Pressure | Clutch (208) Engaged |
| High Torque Acceleration | Not Full Charge | Full/Partial Pressure | Clutch (209) Engaged |
| Constant Speed | Not Full Charge | Full/Partial Pressure | Clutch (209) Engaged |
| Coasting | Not Full Charge | Full/Partial Pressure | Clutch (209) Engaged |
| Vehicle Stop | Not Full Charge | Full/Partial Pressure | Clutch (208) Engaged |
| Braking | Full Charge | Empty/Partial Pressure | Clutch (208,209) Disengaged |
| Low Torque Acceleration | Full Charge | Empty | Clutch (208,209) Disengaged |
| Moderate Torque Accel. | Full Charge | Empty | Clutch (208,209) Disengaged |
| High Torque Acceleration | Full Charge | Empty | Clutch (208,209) Disengaged |
| Constant Speed | Full Charge | Empty | Clutch (208,209) Disengaged |
| Coasting | Full Charge | Empty | Clutch (208,209) Disengaged |
| Vehicle Stop | Full Charge | Empty | Clutch (208,209) Disengaged |
| Braking | Full Charge | Full Pressure | Clutch (208) Engaged |
| Low Torque Acceleration | Full Charge | Full/Partial Pressure | Clutch (208) Engaged |
| Moderate Torque Accel. | Full Charge | Full/Partial Pressure | Clutch (208) Engaged |
| High Torque Acceleration | Full Charge | Full/Partial Pressure | Clutch (208) Engaged |
| Constant Speed | Full Charge | Full/Partial Pressure | Clutch (208) Engaged |
| Coasting | Full Charge | Full/Partial Pressure | Clutch (208,209) Disengaged |
| Vehicle Stop | Full Charge | Full/Partial Pressure | Clutch (208,209) Disengaged |

| Pump-Motor (130) | Swash Plate (216) Angle | Alternator (115) |
|---|---|---|
| Charge Accumulator (138) | Large Angle | No Action |
| No Action | No Displacement | No Action |
| No Action | No Displacement | No Action |
| No Action | No Displacement | No Action |
| No Action | No Displacement | No Action |
| No Action | No Displacement | Charge Battery (111) |
| No Action | No Displacement | Charge Battery (111) |
| Power Hydraulic Motor (119) | Small Angle | No Action |
| Power Vehicle (100) | Large Angle | No Action |
| Power Vehicle (100) | Large Angle | Charge Battery (111) |
| Power Hydraulic Motor (119) | Small Angle | Charge Battery (111) |
| Power Hydraulic Motor (119) | Small Angle | Charge Battery (111) |
| Power Hydraulic Motor (119) | Small Angle | No Action |
| Charge Accumulator (138) | Large Angle | No Action |
| No Action | No Displacement | No Action |
| No Action | No Displacement | No Action |
| No Action | No Displacement | No Action |
| Charge Accumulator (138) | Large Angle | No Action |
| Power Vehicle (100) | Small Angle | No Action |
| Power Vehicle (100) | Large Angle | No Action |
| Power Vehicle (100) | Large Angle | No Action |
| Power Vehicle (100) | Small Angle | No Action |
| No Action | Small Angle | No Action |
| No Action | Small Angle | No Action |

Vehicle (100) Operation Input: Braking, Acceleration (Low Torque, Medium Torque, High Torque), Constant Speed, Coasting, Vehicle Stop
Battery (111): Full Charge, Not Full Charge
High Pressure Accumulator (138): Empty, Partial Pressure, Full Pressure
Transfer Case (128) Clutch: Drive Clutch (208) Engaged, Drive Clutch (208) Disengaged
Control Valve (239):
    Position 1: Control Valve (239) porting Accumulator (138) to Hydraulic Motor (119)
    Position 2: Control Valve (239) Closed
    Position 3: Control Valve (239) porting Pump-Motor (130) to Accumulator (138)
    Position 4: Control Valve (239) porting Pump-Motor (130) to Hydraulic Motor (119)
Pump-Motor (130): No Action, Charge Accumulator (138), Power Hydraulic Motor (119), Power Vehicle (100)
Hydraulic Motor (119): No Action, Power Alternator (115)
Alternator (115): No Action, Charge Battery (111)

| Vehicle (100) Operation Input | Battery (111) | High Pressure Accumulator (138) | Transfer Case (128) Clutch |
|---|---|---|---|
| Braking | Not Full Charge | Empty/Part. Pres. | Drive Clutch (208) Engaged |
| Low Torque Acceleration | Not Full Charge | Empty | Drive Clutch (208) Disengaged |
| Moderate Torque Accel. | Not Full Charge | Empty | Drive Clutch (208) Disengaged |
| High Torque Acceleration | Not Full Charge | Empty | Drive Clutch (208) Disengaged |
| Constant Speed | Not Full Charge | Empty | Drive Clutch (208) Disengaged |
| Coasting | Not Full Charge | Empty | Drive Clutch (208) Disengaged |
| Vehicle Stop | Not Full Charge | Empty | Drive Clutch (208) Disengaged |
| Braking | Not Full Charge | Full Pressure | Drive Clutch (208) Engaged |
| Low Torque Acceleration | Not Full Charge | Full/Part. Pressure | Drive Clutch (208) Disengaged |
| Moderate Torque Accel. | Not Full Charge | Full/Part. Pressure | Drive Clutch (208) Disengaged |
| High Torque Acceleration | Not Full Charge | Full/Part. Pressure | Drive Clutch (208) Disengaged |
| Constant Speed | Not Full Charge | Full/Part. Pressure | Drive Clutch (208) Disengaged |
| Coasting | Not Full Charge | Full/Part. Pressure | Drive Clutch (208) Disengaged |
| Vehicle Stop | Not Full Charge | Full/Part. Pres. | Drive Clutch (208) Engaged |
| Braking | Full Charge | Empty/Part. Pres. | Drive Clutch (208) Engaged |
| Low Torque Acceleration | Full Charge | Empty | Drive Clutch (208) Disengaged |
| Moderate Torque Accel. | Full Charge | Empty | Drive Clutch (208) Disengaged |
| High Torque Acceleration | Full Charge | Empty | Drive Clutch (208) Disengaged |
| Constant Speed | Full Charge | Empty | Drive Clutch (208) Disengaged |
| Coasting | Full Charge | Empty | Drive Clutch (208) Disengaged |
| Vehicle Stop | Full Charge | Empty | Drive Clutch (208) Disengaged |
| Braking | Full Charge | Full Pressure | Drive Clutch (208) Engaged |
| Low Torque Acceleration | Full Charge | Full/Part. Pressure | Drive Clutch (208) Engaged |
| Moderate Torque Accel. | Full Charge | Full/Part. Pressure | Drive Clutch (208) Engaged |
| High Torque Acceleration | Full Charge | Full/Part. Pressure | Drive Clutch (208) Engaged |
| Constant Speed | Full Charge | Full/Part. Pressure | Drive Clutch (208) Disengaged |
| Coasting | Full Charge | Full/Part. Pressure | Drive Clutch (208) Disengaged |
| Vehicle Stop | Full Charge | Full/Part. Pressure | Drive Clutch (208) Disengaged |

FIG. 5A

| Control Valve (239) Position | Pump-Motor 130 | Hydraulic Motor (119) | Alternator (115) |
|---|---|---|---|
| 3 | Charge Accum. (138) | No Action | No Action |
| 2 | No Action | No Action | No Action |
| 2 | No Action | No Action | No Action |
| 2 | No Action | No Action | No Action |
| 2 | No Action | No Action | No Action |
| 2 | No Action | No Action | No Action |
| 4 | Pwr. Hyd. Motor (119) | Power Alternator (115) | Charge Batt.(111) |
| 1 | No Action | Power Alternator (115) | Charge Batt.(111) |
| 3 | Pwr. Vehicle (100) | No Action | No Action |
| 3 | Pwr. Vehicle (100) | No Action | No Action |
| 1 | No Action | Power Alternator (115) | Charge Batt.(111) |
| 1 | No Action | Power Alternator (115) | Charge Batt.(111) |
| 1 | No Action | Power Alternator (115) | Charge Batt.(111) |
| 3 | Charge Accum. (138) | No Action | No Action |
| 2 | No Action | No Action | No Action |
| 2 | No Action | No Action | No Action |
| 2 | No Action | No Action | No Action |
| 2 | No Action | No Action | No Action |
| 2 | No Action | No Action | No Action |
| 1 | Pwr. Vehicle (100) | No Action | No Action |
| 3 | Pwr. Vehicle (100) | No Action | No Action |
| 3 | Pwr. Vehicle (100) | No Action | No Action |
| 1 | Pwr. Vehicle (100) | No Action | No Action |
| 1 | No Action | No Action | No Action |
| 1 | No Action | No Action | No Action |

FIG. 5B

HYDRAULIC BRAKE ENERGY REGENERATION SYSTEM FOR ELECTRIC ENERGY STORAGE AND VEHICLE DRIVE ASSIST

BACKGROUND

Hydraulic drive systems are known to help facilitate the conversion between mechanical energy (e.g., in the forming of rotating shafts) and hydraulic energy, typically in the form of pressure. One hydraulic drive system that is known for use with respect to vehicles is sometimes called a hydraulic launch assist. When a vehicle brakes, mechanical energy from the vehicle driveline is captured by the hydraulic drive system and stored in a high pressure storage device. The hydraulic energy can be converted back into mechanical energy by releasing the pressurized fluid stored in the high pressure storage, which in turn can be used to accelerate the vehicle or power other devices.

BRIEF DESCRIPTION OF THE DRAWINGS

FIG. 4 is a table depicting an exemplary control strategy for operating a hydraulic drive/charging system.

FIG. 5 is a table depicting a second exemplary control strategy for operating a hydraulic drive/charging system.

DETAILED DESCRIPTION

Figure 1:
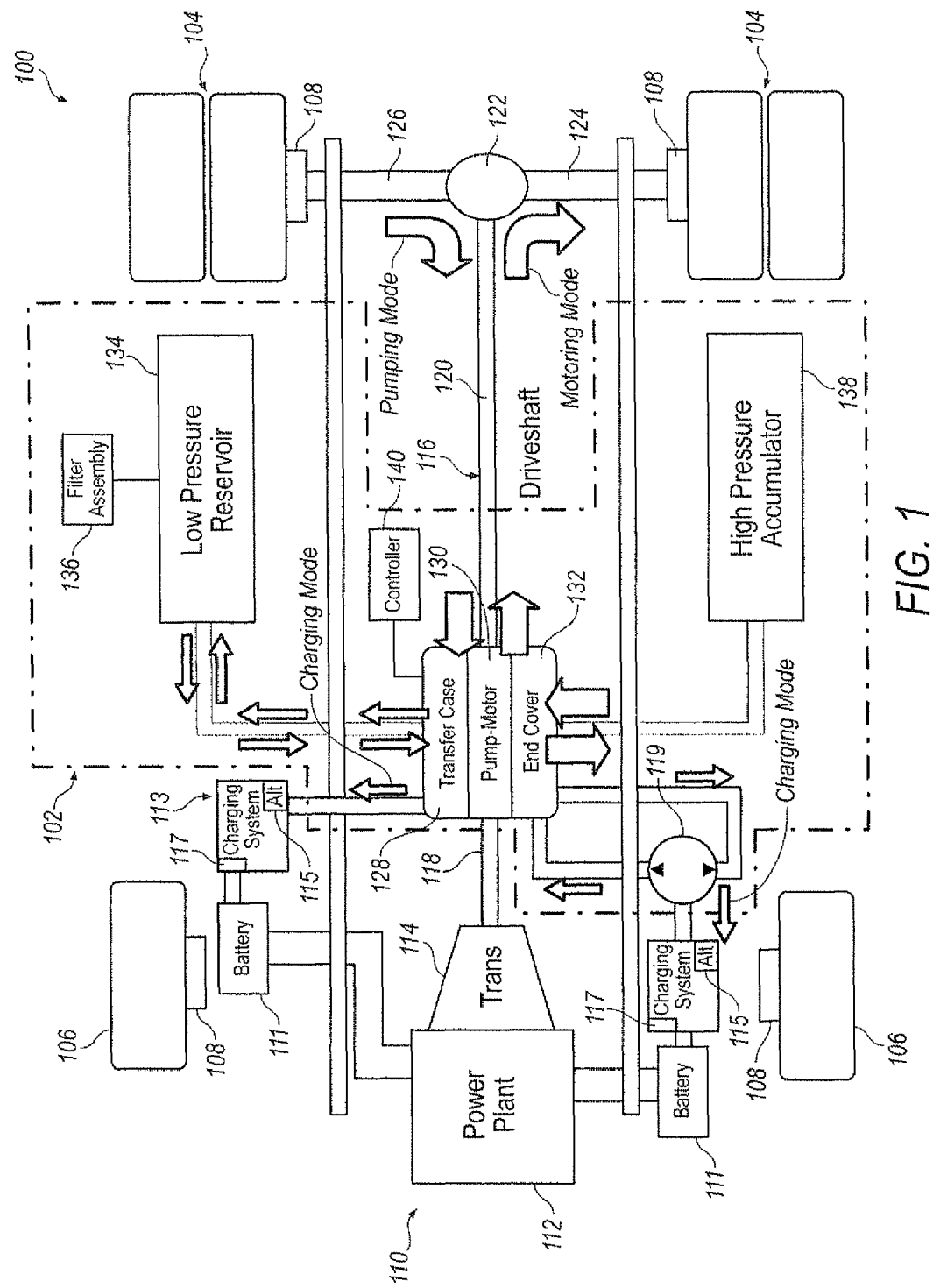
FIG. 1 is a schematic illustration of a vehicle with an exemplary hydraulic drive/charging system.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

To facilitate the discussion that follows, the leading digits of an introduced element number will generally correspond to the figure number where the element is first introduced. For example, vehicle 100 is first introduced in FIG. 1.

Figure 2A:
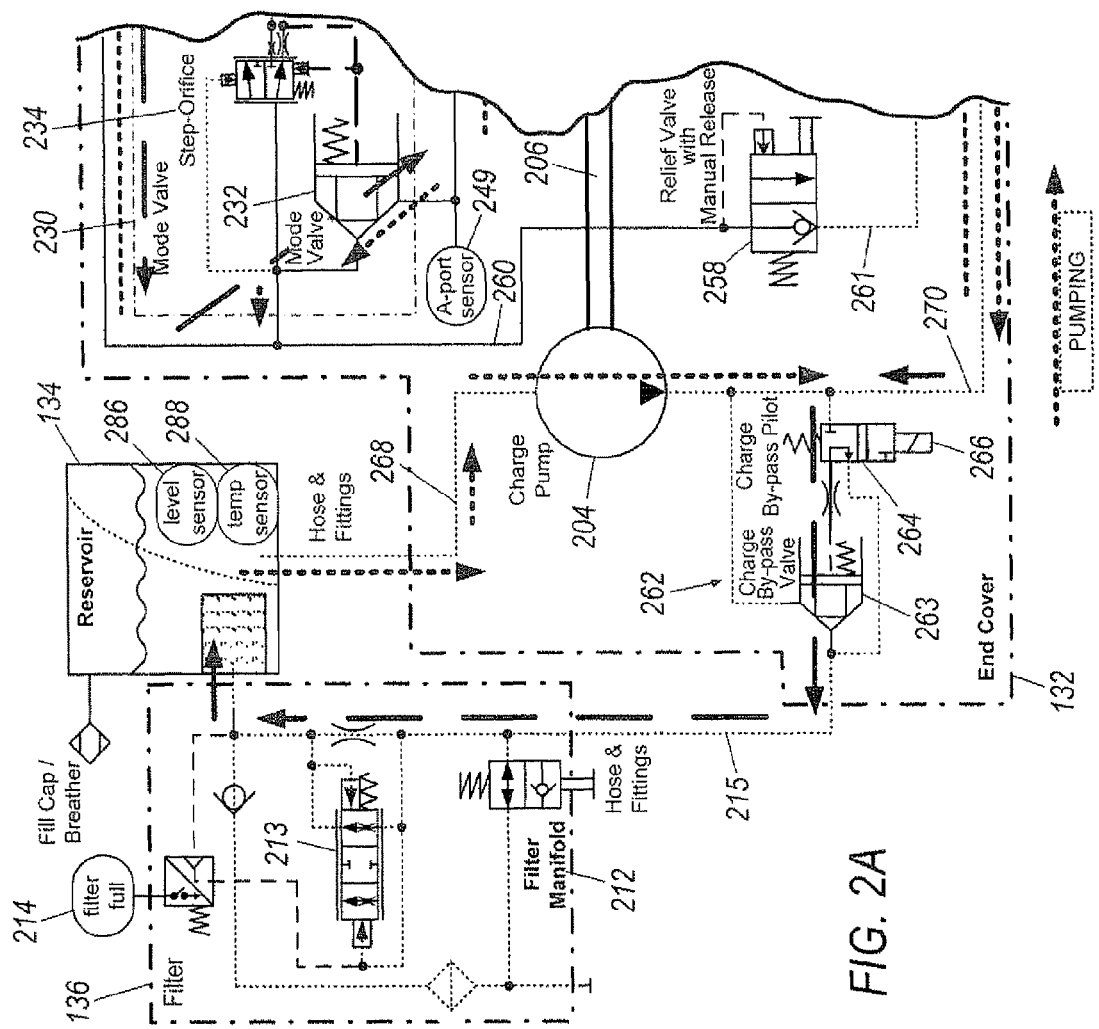
FIGS. 2A and 2B are schematic illustrations of the components of a hydraulic drive/charging system showing an exemplary flow in a motoring mode, a battery charge mode, and a pumping mode.
Figure 2B:
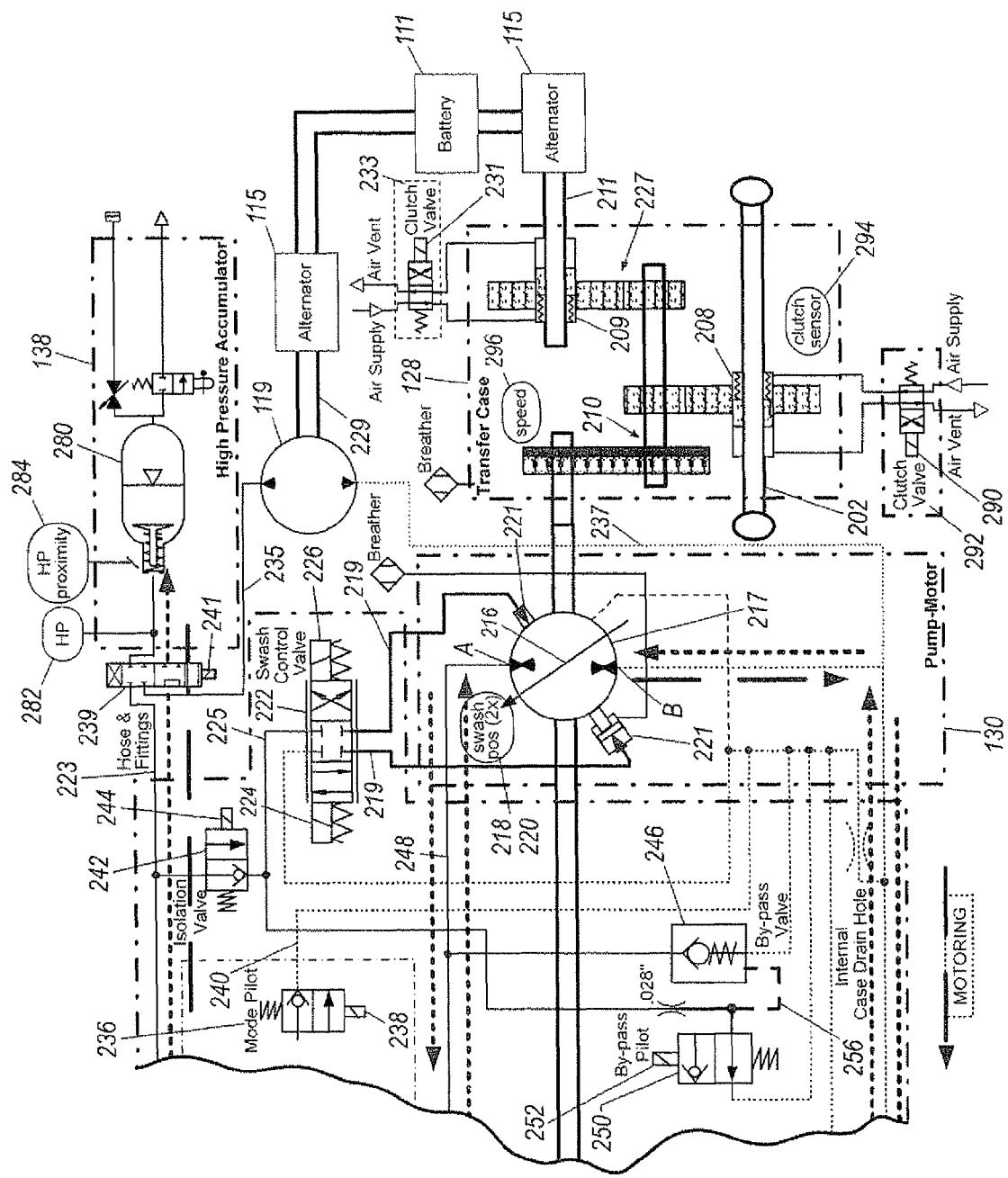

FIG. 1 schematically illustrates a motor vehicle 100 with an exemplary hydraulic drive/charging system 102, known by the trademarks Hydraulic Launch Assist™ or HLA® by the assignee of the present application when used with a vehicle 100. Hydraulic drive/charging system 102 captures and stores a portion of the vehicle's kinetic energy in the form of pressurized hydraulic fluid. The stored hydraulic energy can be converted back into mechanical energy by hydraulic drive/charging system 102, which can be used to propel the vehicle or power other vehicle accessories. For example, the stored hydraulic energy may be used to power a vehicle charging system for charging a battery that supplies power to an electric motor, such as may be found in an electric or hybrid vehicle. Such an arrangement is discussed in more detail below. A more detailed schematic of hydraulic drive/charging system 102, including systems for utilizing the stored pressure energy to power a battery charging system, is illustrated in FIGS. 2A and 2B, and is discussed in detail below.

Vehicle 100 has four rear drive wheels 104 and two front non-drive wheels 106. In other illustrative embodiments all wheels may be drive wheels. Moreover, there may be more or fewer wheels for vehicle 100. Operably associated with each of the wheels 104 and 106 could be a conventional type of wheel brake 108. Preferably, the wheel brakes 108 are part of an overall electro-hydraulic brake (EHB) system, of a well known type, and commercially available.

Vehicle 100 includes a vehicle drive system, generally designated 110. Vehicle drive system 110 includes a vehicle power plant 112, a transmission 114, and hydraulic drive/charging system 102. Transmission 114 is operatively connected to power plant 112 and transmits torque generated by power plant 112 to wheels 104. Transmission 114 also interacts with hydraulic drive/charging system 102, as discussed in greater detail below. The particular type of power plant 112 and transmission 114, and the construction details thereof, as well as the arrangement of drive system 110, may be varied in a variety of ways. For example, it will be understood that references to a "power plant" include any type of power source or other prime mover, including, but not limited to, an internal combustion engine, electric motor, or combination thereof. Finally, although hydraulic drive/charging system 102 is illustrated and described in connection with a vehicle drive system 110, it may be utilized advantageously with any sort of hydraulic drive/charging system of the type illustrated and described hereinafter, whether or not such system is part of a vehicle.

Extending rearwardly from the transmission 114 and also forming a portion of vehicle drive system 110 is a drive-line, generally designated 116. In the illustrated system 110, and by way of example only, drive-line 116 includes a forward drive shaft 118, an intermediate drive shaft (not visible herein, but illustrated as element 202 in FIG. 2B), a rearward drive shaft 120, an inter-wheel differential 122, and left and right rear axle shafts 124 and 126. Drive-line 116 has been illustrated and described as including shafts 118, 202, 120, 124 and 126 primarily to facilitate understanding of the overall vehicle drive system 110, and not by way of limitation. For example, there may be fewer or more shafts and the shafts may be permanently or selectively connected to one another by way of clutches.

Hydraulic drive/charging system 102 is directed to the storing and releasing of hydraulic energy. As illustrated generally in FIG. 1, hydraulic drive/charging system 102 includes a pump-motor 130 for selectively converting hydraulic energy, stored in the form of high pressure fluid in reservoir 138, to mechanical energy, as well as converting mechanical energy associated with drive system 110, and in particular drive-line 116, to hydraulic energy. A transfer case 128 operably connects drive-line 116 to pump-motor 130. Mechanical energy associated with drive-line 116 is transferred through transfer case 128 to pump-motor 130. Pump-motor 130 converts the mechanical energy to hydraulic energy by compressing a low pressure hydraulic fluid delivered to pump-motor 130 from low pressure reservoir 134. The pressurized hydraulic fluid is transferred from pump-motor 130 to high pressure accumulator 138 for storage. The stored energy can be converted back to mechanical energy by passing the high pressure hydraulic fluid through pump-motor 130, which converts the stored energy to mechanical energy that can be output from transfer case 128. The low pressure hydraulic fluid discharged from pump-motor 130 is returned to low pressure reservoir 134 for storage. An end cover 132 includes various valves and controls for controlling the distribution of hydraulic fluid between low pressure reservoir 134, pump-motor 130, and high pressure accumulator 138. The various structural and operation aspects of hydraulic drive/charging system 102 are discussed in more detail subsequently in connection with FIGS. 2A and 2B.

As previously noted, power plant 112 may include an electric motor for generating mechanical energy for propelling vehicle 100. Power for operating the electric motor can be supplied by one or more batteries 111. Operating the electric motor depletes the energy stored within battery 111, requiring the battery to be occasionally recharged. As illustrated in FIG. 1 (and shown in more detail in FIGS. 2A and 2B) vehicle 100 may include a battery charging system 113 for selectively charging battery 111 while operating vehicle 100. Battery charging system 113 may include an alternator 115, or other suitable electric current producing source, such as a generator, to produce the desired electric current for charging battery 111. Battery charging system 113 may also include various known electronics 117 for suitably conditioning the electric current for charging battery 111, such as may be required for converting alternating current to direct current. When alternator 115, or another similar device, is used to generate electric current, the mechanical energy required to operate alternator 115 can be supplied from hydraulic drive/charging system 102.

There are various arrangement by which the energy stored within hydraulic drive/charging system 102 can be transferred to alternator 115, two of which are illustrated in FIG. 1 (and in more detail in FIGS. 2A and 2B). One exemplary arrangement is to suitably couple alternator 115 to an output of transfer case 128, thus enabling mechanical energy produced by pump-motor 130 to be transferred through transfer case 128 to alternator 115. Another exemplary arrangement is to provide a separate hydraulic motor 119 with which to power alternator 115. Hydraulic motor 119 operates in similar manner as pump-motor 130 when operating as a motor. Energy stored in high pressure accumulator 138 is converted to mechanical energy by passing the high pressure hydraulic fluid through hydraulic motor 119, which outputs a rotational torque for operating alternator 115. Low pressure hydraulic fluid discharged from hydraulic motor 119 is returned to low pressure reservoir 134 for storage. For purposes of illustrative convenience, both approaches for transferring energy stored within hydraulic drive/charging system 102 to alternator 115 are illustrated in FIG. 1 (as well as in more detail in FIGS. 2A and 2B), and it shall be understood that both approaches do not have to be present in the same system, although they can be. The two exemplary arrangements may be used independent of one another or together in the same system depending on the design and performance requirements of the particular application. It is also to be understood that the two disclosed arrangements are merely to facilitate discussion and are not limiting.

An exemplary arrangement of hydraulic drive/charging system 102 is illustrated in more detail in FIGS. 2A and 2B. More specifically, FIGS. 2A and 2B schematically illustrate the exemplary arrangement of the various elements of hydraulic drive/charging system 102 and their physical relationship with one another. As noted above, the disclosed arrangement is merely to facilitate discussion and the arrangement is not limiting. Moreover, certain elements may be added or removed without compromising the relevant operation of the hydraulic drive/charging system 102. FIGS. 2A and 2B include a number of sensors, switches, and solenoids.

With reference to FIGS. 1, 2A and 2B, hydraulic drive/charging system 102 includes transfer case 128, a hydrostatic pump-motor 130, an end cover 132 retaining a charge pump 204 (shown in FIG. 2A) and a plurality of valve mechanisms 222, 232, 239, 242, 246, and 258, hydraulic motor 119, low pressure reservoir 134, a filter assembly 136 and high pressure accumulator 138. Low pressure reservoir 134 is a type of accumulator, but of the low pressure type, as opposed to high pressure accumulator 138. Thus, the terms low pressure reservoir and low pressure accumulator are used interchangeably for element 134. More generally, accumulator 138 is an example of a high pressure storage device while reservoir 134 is an example of a low pressure storage device. Since a reservoir is being used, hydraulic drive system 102 is an example of an open circuit. U.S. Pat. No. 6,971,232 illustrates an example of a closed system using an accumulator rather than a reservoir that is open to atmospheric pressure. The contents of U.S. Pat. No. 6,971,232 are incorporated herein by reference in its entirety. For various concepts discussed below, either a closed system or an open system may be used. Thus, the general layout of hydraulic drive/charging system 102 shown in the figures is merely illustrative.

While the various components are illustrated having particular physical structures for convenience of discussion, it is possible for any or all of the components to be within a single or a subset of structures. Merely by way of example, motor-pump 130 and hydraulic pump 119 could be incorporated within end cover 132. Furthermore, motor-pump 130, end cover 132, transfer case 128 and hydraulic pump 119 could be located within a single structure. Moreover, not all components or sub-components (e.g., a specific element) are required. For instance, while a charge pump 204 is illustrated, in practice such a pump may not be required in view of the dual operationality of pump-motor 130 as discussed below. Likewise, a charge pump may not be required if a low pressure closed accumulator were used rather than a low pressure reservoir 134 operating at atmospheric pressure.

Various other components also may not be required depending on the approach used for transferring energy stored within hydraulic drive/charging system 102 to alternator 115. As noted previously, FIG. 2A illustrates two separate approaches for transferring energy between hydraulic drive/charging system 102 and alternator 115. One approach entails suitably coupling alternator 115 to transfer case 128, and the other involves providing a separate hydraulic motor 119 to power alternator 115. It should be noted that, for purposes of illustrative convenience, the two alternators 115 associated with the respective approaches are shown in FIG. 2A electrically connected to a common battery 111. It shall be understood, however, that if both approaches are incorporated into a common system (though they need not be), each alternator may also be electrically connected to separate batteries. If power for operating alternator 115 is drawn from transfer case 128, hydraulic pump 119 and its associated flow structure, including a control valve 239 and conduits 235 and 237, may not be required. Conversely, if power for operating alternator 115 is provided by hydraulic pump 119, certain components within transfer case 128 may not be required, such as an alternator shaft 211, alternator clutch 209, and gearing 227.

In general terms, pump-motor 130, hydraulic motor 119, and components within end cover 132 provide the hydraulic pathways for movement of a hydraulic fluid, such as oil, between low pressure reservoir 134 and high pressure accumulator 138. As illustrated using a combination of FIGS. 1, 2A and 2B, transfer case 128 may include a first shaft 206 operably connecting hydraulic drive/charging system 102 to vehicle drive system 110 and alternator 115. Shaft 206 can be mechanically connected to both the pump-motor 130 and the charge pump 204. Drive clutch 208 and gearing 210 selectively transfer torque between shafts 202 and 206. Transfer case 128 may also include alternator shaft 211 operably connecting hydraulic drive/charging system 102 to alternator 115. Alternator clutch 209 and gearing 227 selectively transfer torque between shafts 206 and 211. It should be noted that alternator clutch 209, gearing 227, and shaft 211 may not be required if transfer case 128 is not used to transfer mechanical energy from pump-motor 130 to alternator 115, such as may occur, for example, when using hydraulic motor 119 to power alternator 115.

Pump-motor 130 is used to convert between mechanical energy associated with the various shafts, including shafts 206, 202 and 211, and hydraulic energy stored in the form of pressure within hydraulic drive/charging system 102. Under normal operation of hydraulic drive/charging system 102 in a pumping mode, mechanical energy is stored as hydraulic energy. Conversely, in normal operation of hydraulic drive/charging system 102 in a motoring or battery charge mode, hydraulic energy is converted to mechanical energy.

Typically, drive system 110, including hydraulic drive/charging system 102, operates in three different modes at different times. In a first mode of drive system 110, called a regeneration or pumping mode (typically occurring in a deceleration or braking cycle), a vehicle slows down, such as by an operator signaling a braking operation. Kinetic energy of the vehicle then drives pump-motor 130 as a pump, transferring hydraulic fluid from low pressure reservoir 134 to high pressure accumulator 138, and removing additional torque from drive-line 116. While not necessarily required, one advantage of using charge pump 204 is that it helps to prevent undesirable cavitation within pump-motor 130. In the illustrated system 100 energy comes from wheels 104 in the form of torque, through axle shafts 124 and 126, through differential 122, and then by way of shafts 116 and 202 into transfer case 128. In some approaches, wheels 106 may include appropriate shafting and related mechanisms to permit a similar recovery of kinetic energy. When drive clutch 208 is applied, energy of braking is transferred through gearing 210 to shaft 206, and finally to charge pump 204 and pump-motor 130. When a nitrogen gas accumulator is used, the fluid compresses the nitrogen gas within the accumulator 138 and pressurizes hydraulic drive/charging system 102. Under some circumstances it may be possible to undertake a regeneration of pumping mode using power plant 112 by way of transmission 114 and shaft 118, also connected to drive shaft 202.

In a second mode of drive system 110, called a launch assist or motoring mode (typically occurring in an acceleration cycle), fluid in high pressure accumulator 138 is metered out to drive pump-motor 130 operating as a motor. Pump-motor 130 applies torque to shaft 206 that is transferred through gearing 210, through applied drive clutch 208 and then through shafts 206, 120, differential 122, axle shafts 124 and 126, and finally to wheels 104. The motoring mode stops when most of the pressure is released from high pressure accumulator 138. Before motoring can again commence, regeneration of high pressure accumulator 138 using the pumping mode must occur.

In a third mode of drive system 110, called a battery charge mode, which typically occurs when the vehicle in not operating in a braking cycle (although it may occur during a braking cycle when high pressure accumulator 138 is generally fully pressurized), fluid in the high pressure accumulator 138 is metered out either to pump-motor 130 or hydraulic motor 119, depending on whether transfer case 128 or hydraulic motor 119 is used to power alternator 115, at a flow rate dictated by the charge rate of battery 111. When using transfer case 127 to power alternator 115, pump-motor 130 applies torque to shaft 206 that is transferred through gearing 210, through applied alternator clutch 209, and then through shaft 211 to alternator 115. Alternator 115 generates an electric current for charging battery 111. When using hydraulic motor 119 to power alternator 115, torque produced by hydraulic motor 119 is transferred through shaft 229 to alternator 115. The battery charge mode stops when most of the pressure is released from high pressure accumulator 138. At least partial regeneration of high pressure accumulator 138 using the pumping mode must occur before battery charging can again commence A controller 140 at least partly controls hydraulic drive/charging system 102. Various informational inputs are received by controller 140, and then heuristics, i.e., logical rules or processes, are applied to the inputs. Outputs are then generated that influence operation of hydraulic drive/charging system 102 in the context of the overall operation of drive system 110 and battery charging system 113 of vehicle 100. While a separate controller 140 is illustrated, controller 140 may be incorporated into an overall vehicle electronic control unit (ECU) or as part of an ECU associated with engine 110 or transmission 114, or some combination thereof.

Figure 3A:
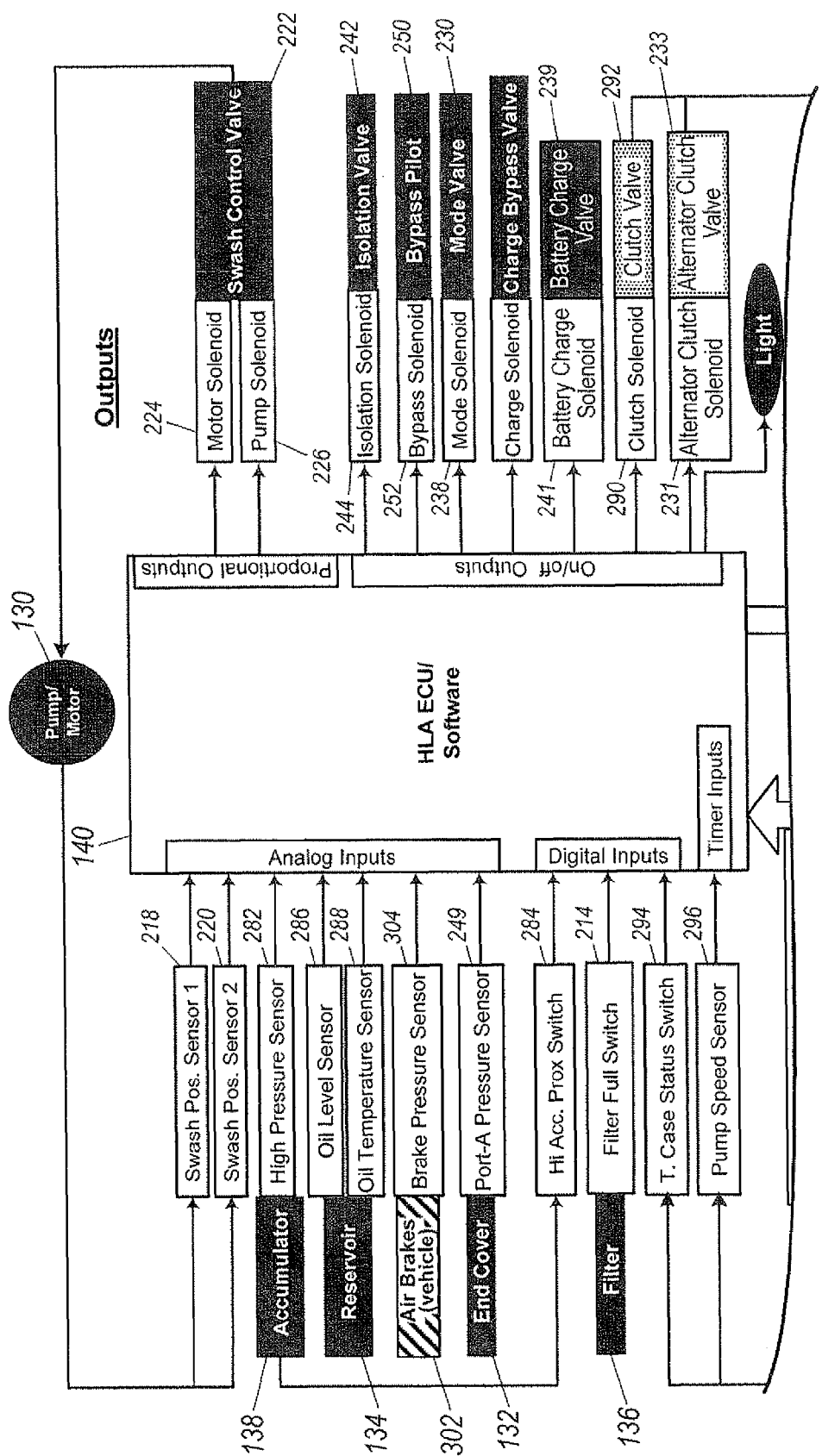
FIG. 3 illustrates various exemplary inputs and outputs associated with an exemplary hydraulic drive/charging system that are used by a controller.
Figure 3B:
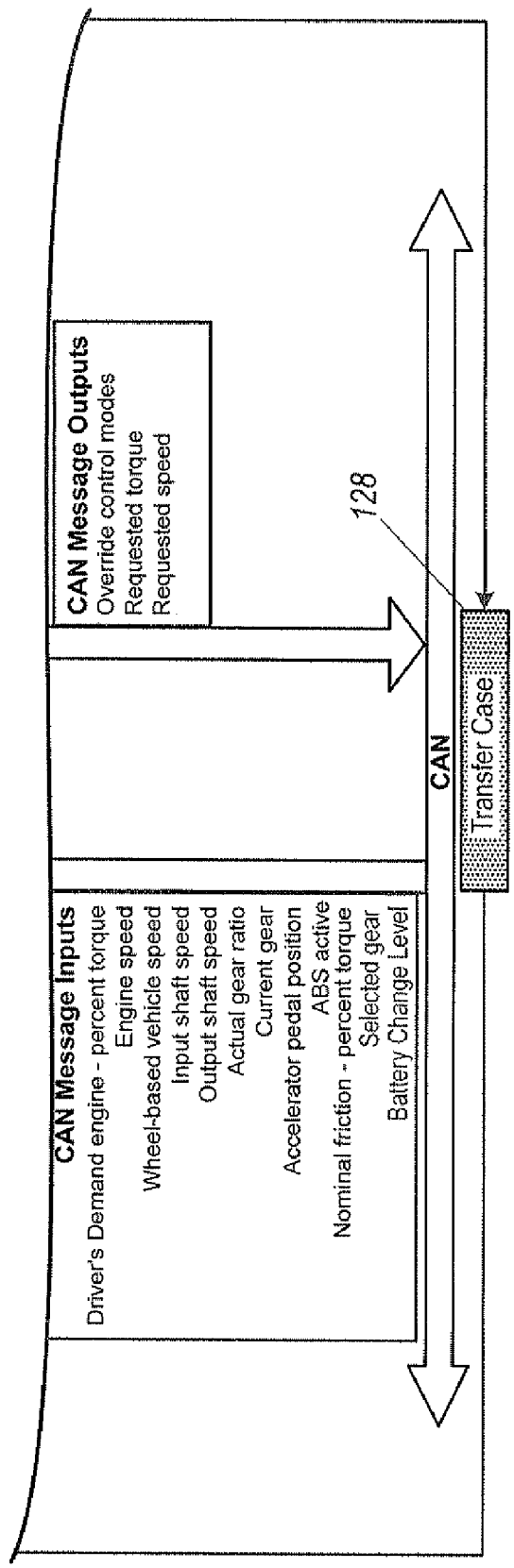

Various inputs and outputs associated with hydraulic drive/charging system 102 that are used by controller 140 are illustrated in FIG. 3. For each of the sensors or switches discussed and illustrated in FIGS. 2A and 2B, the same switch or sensor is shown in FIG. 3. Similarly, for each of the solenoids discussed and illustrated in FIGS. 2A and 2B, a corresponding output from controller 140 is also shown in FIG. 3. As illustrated in FIG. 3, some of the inputs received by controller 140 from the elements associated with FIGS. 2A and 2B are analog, while others are either digital or time-related. Similarly, some outputs to elements associated with FIGS. 2A and 2B have a range of values or are proportional in nature, while others are binary in nature.

Further, as illustrated in FIG. 3, when a separate electronic control unit (ECU) is in communication with other ECUs within vehicle 100, controller 140 receives message inputs from the overall vehicle Controller Area Network (CAN) and submits message outputs to the CAN. A well known communications standard defined by the Society of Automotive Engineers (SAE) is SAE J1939 for CAN-based communications. SAE J1587 is another possible communications standard that could also be used, but is generally not as robust. Moreover, other communications standards, such as ISO9141 K, or other known standards, may be used. The terminology associated with the various inputs, which follows, is provided in accordance with J1939.

Examples of possible CAN messages that can be input into controller 140 follow in Table 1:

TABLE 1

Can Message Inputs

Driver's demand, engine - percent torque
Driver's demand, engine - engine speed
Wheel-based vehicle speed TABLE 1-continued Can Message Inputs Input shaft speed
Output shaft speed (TransShaftSpeed)
Actual gear ratio
Current gear
Accelerator pedal position
ABS active
Nominal friction - percent torque
Battery Charge Level Examples of possible CAN messages that can be output from controller 140 follow in Table 2:

TABLE 2

Can Message Outputs

Override control modes
Requested torque
Requested speed

Referring back to FIG. 2A, filter assembly 136 includes various valving, including a filter manifold 212, a valve mechanism 213 and a digital switch 214 that triggers only when the filter is full. Switch 214 of filter assembly 136 is also illustrated in FIG. 3 as one of the digital inputs into controller 140. It is envisioned that various filter assemblies 136 may be used within hydraulic drive/charging system 102. One exemplary assembly 136 is discussed in co-pending application Ser. No. 11/408,504, which is a continuation-in-part of application Ser. No. 10/828,590 and a continuation-in-part of Ser. No. 10/624,805, all of which are incorporated herein in their entirety.

Filter assembly 136 is in communication with a port of low pressure reservoir 134 by means of a conduit 215, disposed on the "low pressure" side of hydraulic drive/charging system 102. In general, the conduits associated with the "low pressure" side are illustrated by closely dashed lines between components while conduits associated with the "high pressure" side are illustrated by solid lines between components. Internal conduits disposed solely between elements making up a component are illustrated in a "bolder" line weight and are not necessarily part of the "high pressure" or the "low pressure" side of the system. Often, they are selectively part of one side or the other.

The operation of an exemplary filter assembly 136 in the context of a hydraulic drive system, such as exemplary hydraulic drive/charging system 102, is discussed in greater detail in U.S. Pat. No. 6,971,232, the contents of which are incorporated herein by reference in their entirety.

In one illustration, pump-motor 130 is of the variable displacement type. However, pump-motor 130 may be of many types of constructions including, but not limited to bent axis, vane, or radial piston. In the present illustration, pump-motor 130 is an axial piston type. It includes a swash-plate 216 contained within a pump-motor unit 217 and two swash position sensors 218 and 220. To vary the angular displacement of the swash-plate, pump-motor unit 217 includes some sort of displacement-varying means, such as at least two fluid pressure servo actuators (stroking cylinders) of the type shown in FIG. 2B and designated as 221. More information concerning the stroking cylinders is provided in U.S. Pat. No. 7,076,946, which is incorporated herein in its entirety. Any of a variety of servo actuators may be used and are not limited to the type of actuators schematically represented in FIGS. 2A and 2B.

Servo actuators 221 are connected hydraulically to the outlets of a typical electro-hydraulic controller by way of conduits 219, the electro-hydraulic controller labeled as a swash control valve 222. Swash control valve 222 is located within end cover 132. The operation of swash control valve 222 is to communicate pressurized fluid from a conduit 225 on the "high pressure" side of the system to servo actuators 221 using conduits 219 as appropriate to achieve the desired angle and displacement of swash-plate 216, all of which is generally well known to those skilled in the pump and motor art, and especially, in the axial piston pump art. To control the operation of the appropriate servo actuators 221, swash control valve 222 includes a motor solenoid 224 and a pump solenoid 226. The two solenoids are controlled proportionally by controller 140 and are used to position swash-plate 216, by way of valve 222 and the appropriate servo actuator 221, either in a positive angular displacement when the motoring mode or battery charge mode is desired, or in a negative angular displacement when the pumping mode is desired. The angular displacement of swash-plate 216 is determined by either position sensor 218 or position sensor 220, the readings of which are then input into controller 140, as shown in FIG. 3. Typically, only one sensor is required, the other sensor acting as a backup in case of failure of the other sensor. It is possible, however, that both sensors 218 and 220 might be used together to provide an average determination of the angular displacement of swash-plate 216.

Whenever pump-motor unit 217 is in its neutral condition (which is the typically the case whenever the vehicle is neither in motoring mode, battery charge mode, nor pumping mode), there is substantially no flow within hydraulic drive/charging system 102 between pump-motor 130 and accumulators 134 and 138 (although there may be flow between hydraulic motor 119 and accumulators 134 and 138 when operating the vehicle in the battery charge mode). However, as is well known, because of the pre-charge on each of the accumulators 134 and 138, hydraulic drive/charging system 102 remains "pressurized" even while pump-motor unit 217 is in its neutral condition. When pump-motor unit 217 is in its neutral condition, then ideally swash-plate 216 has zero angular displacement.

In addition to swash control valve 222, end cover 132 includes a mode control valve assembly 230 for selectively controlling the flow of fluid between accumulators 134 and 138 when operating in the pumping or drive mode, as well as when operating in the battery charge mode where transfer case 128 provides the torque for driving alternator 115. Mode control valve assembly 230 includes a mode valve 232. Operably associated with, i.e., incorporated into, mode control valve 232 is a step-orifice control valve 234, and a solenoid type mode pilot valve 236 with an on/off solenoid 238, the outlet of the mode pilot valve being in communication with a source of low pressure (such as reservoir 134, or merely the low pressure side of hydraulic drive/charging system 102) by means of a conduit 240. The operation of an exemplary mode valve assembly 230 in the context of a hydraulic drive system, such as exemplary hydraulic drive/charging system 102, is discussed in greater detail in U.S. Pat. No. 6,971,232, the contents of which are incorporated herein by reference in their entirety.

End cover 132 also includes an isolation valve 242 that is disposed in series in conduit 243 between high pressure accumulator 138 and swash control valve 222. Isolation valve 242 is preferably a poppet-type valve, which is operated by solenoid 244. Whenever pump-motor 130 is activated, isolation valve 242 is "ON", i.e., high pressure is freely communicated from high pressure accumulator 138 to swash control valve 222 by way of conduit 223. Whenever pump-motor 130 is deactivated, isolation valve 61 is spring-biased to the "OFF" position shown in FIG. 2A, in which the isolation valve keeps pump-motor 130 and swash control valve 222 "isolated" hydraulically from high pressure accumulator 138, so that high pressure accumulator 138 does not "leak down" through the swash control valve while pump-motor 130 is deactivated. The isolation valve also provides pilot pressure to by-pass valve 246.

References herein to hydraulic drive/charging system 102 being "OFF" will be understood to mean and include both that portion of the vehicle 100 operating cycle when the vehicle 100 is not in a pumping-motoring-charging mode, as well as those times when the vehicle 100 is not operating at all (engine "off" condition).

End cover 132 also has a by-pass valve 246, which may also be referred to as an "unloading" valve or as a "dump" valve, as those terms are well understood in the valve art. Bypass valve 246 is disposed between the outlet port A of pump-motor unit 217 at its input and the "low pressure" side of the hydraulic drive system at its output. It is used to "unload" pump-motor 130.

To help determine the pressure level within the "high pressure" side, such as within conduit 248, end cover 132 includes a sensor 249, the readings of which are input into controller 140 as shown in FIG. 3. Sensor 249 may be of any type and is not limited to an analog sensor. Sensor 249 is used to measure exit pressure from port A of pump-motor 130.

The by-pass valve 246 will "unload" pump-motor 130 whenever the engine is "off," i.e., no driving pressure is present in the conduit 223 or in conduit 248, so that pump-motor 130 does not transmit unintended torque to shaft 202. To unload pump-motor 130, a by-pass pilot 250 with associated controllable solenoid 252 is operatively connected to by-pass valve 246 by an internal conduit 256. By-pass pilot 250 selectively permits by-pass valve 246 to open, thereby releasing pressure from the "high pressure" side of the system to the "low pressure" side. When hydraulic drive/charging system 102 is operational, however, by-pass pilot 250 and associated solenoid 252 prohibit the pressurized fluid from passing through by-pass valve 246, as is well known.

Hydraulic drive/charging system 102 also includes, in the end cover 132, a relief valve generally designated 258 which, as is shown in FIG. 2A, is spring biased to a closed position. The valve 258 is illustrated as a poppet valve. An inlet of relief valve 258 is in communication with a conduit 260, which interconnects the inlet of relief valve 258 with the port of high pressure accumulator 138 by way of conduit 223, and with the inlet of mode control valve 230. Whenever the pressure in conduit 260 exceeds a predetermined maximum, relief valve 258 is biased (moved "left" in FIG. 2A) to a position which permits communication from conduit 256 to a conduit 261, which is on the "low pressure" side of the hydraulic drive/charging system 102.

A charge by-pass valve assembly 262, including a charge by-pass valve 263, a charge by-pass pilot 264, and a charge by-pass pilot solenoid 266 are illustrated in FIG. 2A as disposed between low pressure conduit 270 and low pressure conduit 215. Charge by-pass valve assembly 262 is closed by way of solenoid 266 during a pumping operation so that fluid flowing through charge pump 204 and pump-motor 130 is not simply recycled back to low pressure reservoir 134 without charging high pressure accumulator 138. However, charge by-pass valve assembly 262 is open during motoring and battery charging as illustrated in FIG. 2A.

High pressure accumulator 138 is illustrated as being located outside of end cover 132. However, as noted above, in some cases components, such as high pressure accumulator 138, can be located in the same physical housing or structure as those discussed with respect to end cover 132. Similarly, components physically located within end cover 132, for example, may be associated with other structures without precluding proper operation of hydraulic drive/charging system 102.

High pressure accumulator 138 represents the termination of the "high pressure" side of hydraulic drive/charging system 102 in association with conduits 223 and 245. High pressure accumulator 138 includes a high pressure accumulator unit 280, a pressure level sensor 282 and a high pressure accumulator proximity switch 284. Sensor 282 is analog and is used to measure the pressure associated with or stored in accumulator unit 280. By way of example only, high pressure accumulator 138 is of the gas-charge type. At the end of a typical deceleration cycle (pumping mode), high pressure accumulator unit 280 is charged up to the maximum system pressure, typically about 5000 pounds per square inch (PSI), but possibly even higher.

During the motoring and battery charge modes, where the stored pressurized fluid within accumulator 138 is released, a pressure point may be reached where high pressure proximity switch 284 generates a digital signal indicating the closing of accumulator unit 280, whereby further flow of pressurized fluid from the accumulator is prohibited. Switch 284 also selectively provides that signal as an input to controller 140, as shown in FIG. 3. In general, switch 284 only triggers when too much of the pressurized fluid has escaped from accumulator unit 280 during the motoring or battery charge modes and the pressure within the accumulator unit has abruptly dropped toward zero. This condition is undesired. Nor does it occur frequently. However, when it does occur, hydraulic drive/charging system 102 uses the occurrence to learn how to prevent it from occurring again. A hydraulic pressure is necessarily maintained, within the accumulator 138, such that a minimum amount of oil is always retained in the high pressure accumulator and such that there is always a predetermined minimum charge pressure within both of the conduits 223 and 260.

Low pressure accumulator or reservoir 134 represents the termination of the "low pressure" side of hydraulic drive/charging system 102 in association with conduits 215 and 268. Conduit 215 is used to provide hydraulic fluid to low pressure reservoir 134 by way of filter assembly 136, while conduit 268 represents the pathway by which fluid is removed from the reservoir, such as that necessary to charge high pressure accumulator 138.

When element 134 is a reservoir, as shown in the exemplary system 102, it includes a hydraulic fluid level sensor 286 and a hydraulic fluid temperature sensor 288. The sensors may be analog or digital or of any type performing the requested function. In general, the type of sensors used within hydraulic drive/charging system 102 is not intended to be limited to that illustrated. The level of fluid within reservoir 134 increases as motoring and battery charging takes place, and decreases as pumping removes fluid from the reservoir to recharge high pressure accumulator 138. The fluid level is also increased when hydraulic drive/charging system 102 is shut down. Typically, the temperature of the hydraulic sensor will increase as hydraulic drive/charging system 102 is utilized, but is also influenced by outside environmental conditions, such as ambient temperature.

Transfer case 128 and several of its elements were discussed above with respect to FIG. 1. Transfer case 128 represents the interface between the mechanical portions of vehicle drive system 110 and battery charging system 113, and hydraulic drive/charging system 102. Continuing to reference FIGS. 2A and 2B, intermediate shaft 202 forms a portion of vehicle drive-line 116. Shaft 202 is selectively engaged to hydraulic drive/charging system 102 by way of drive clutch 208. In the illustrated system, drive clutch 208 is pneumatically operated by way of a clutch solenoid 290 forming part of a clutch valve 292, the activation signal of which is generated by controller 140, as shown in FIG. 3. A corresponding confirmation that the clutch has engaged is determined using digital clutch sensor 294, which is input into controller 140 as a transfer case status switch digital signal. Gearing 210 is shown using a two-stage reduction so as to provide an appropriate balance between the rotational speed and associated torque of shaft 206, which is connected to pump-motor unit 217 and charge pump 204. Other gear ratios may also be used depending on the arrangement desired and the nature of the pumps. Shaft 206 selectively rotates. It will not always be rotating even if shaft 202 is rotating. On the other hand, it is possible for shaft 206 to rotate even if shaft 202 is not rotating. Drive clutch 208 and gearing 210 provide the interface between shafts 202 and 206.

When transfer case 128 is used to power alternator 115, transfer case 128 may also include alternator shaft 211, which mechanically connects shaft 206 to an input shaft of alternator 115. Shaft 211 is selectively engaged to hydraulic drive/charging system 102 by way of alternator clutch 209. In the illustrated system, alternator clutch 209 is pneumatically operated by way of a clutch solenoid 231 forming part of a clutch valve 233, the activation signal of which is generated by controller 140, as shown in FIG. 3. Gearing 227 adjusts the rotational speed and output torque of shaft 206 to correspond to the operational requirements of alternator 115. Alternator clutch 209 and gearing 227 provide the interface between shafts 211 and 206.

To determine the speed of shaft 206, a speed sensor 296 is used. The speed of shaft 206 is then input as a timer input into controller 140, as shown in FIG. 3. Typically, the speed of shaft 206 is measured in revolutions per minute, although other units of measurement may also be used. Speed sensor 296 provides another mechanism to determine if drive clutch 208 has engaged, even if clutch sensor 294 suggests that the clutch has engaged.

As noted previously, hydraulic motor 119 may be used to power alternator 115 for charging battery 111. Hydraulic motor 119 can be operably connected to input shaft 229 of alternator 115. When operating hydraulic drive/charging system 102 in the battery charge mode, high pressure hydraulic fluid from high pressure accumulator 138 is metered out to hydraulic motor 119 at a flow rate dictated by the charge rate of battery 111. Hydraulic motor 119 generates rotational torque as the high pressure fluid passes though the motor. The rotational torque is transferred through input shaft 229 to alternator 115, which generates current for charging battery 111. The battery charge mode stops when most of the pressure within high pressure accumulator 138 has been expended. Battery charging cannot resume by way of hydraulic motor 119 until high pressure accumulator 138 has been at least partially regenerated. Hydraulic motor 119 is fluidly connected to low pressure accumulator 134 through conduit 237.

When utilizing hydraulic motor 119 to power alternator 115, a 4-position solenoid actuated control valve 239 may be provided for selectively distributing high pressure fluid between high pressure accumulator 138, hydraulic motor 119, and pump-motor 130. Control valve 239 includes a solenoid 241 in operable communication with controller 140. Control valve 239 is fluidly connected to mode valve 232 and pump-motor 130 through conduits 223 and 248, to hydraulic motor 119 through conduit 235, and high pressure accumulator 138 through conduit 245. Control valve 239 includes four separate position settings for selectively distributing fluid between pump-motor 130, hydraulic pump 119 and high pressure accumulator 138. A first position ports accumulator 280 to hydraulic motor 190. Control valve 239 is closed when positioned in a second position, thereby generally preventing fluid from passing between accumulator 280, pump-motor 230, and hydraulic motor 119. A third position ports pump-motor 130 to accumulator 280. Finally, a fourth position ports pump-motor 130 to hydraulic motor 119. It should be understood that control valve 119 may not be required when not using hydraulic motor 119 to power alternator 115, such as may occur, for example, when using transfer case 128 to power alternator 115. Under such a scenario, conduit 245 may be connected directly to conduit 223.

Still referring to FIG. 2B, pump-motor unit 217 includes a port (designated "A"), which is connected by means of the "high pressure" level conduit 248 to mode control valve 232. Pump-motor unit 217 also includes another port (designated "B") which, by means of the "low pressure" conduit 270, is in fluid communication with filter assembly 136 after passing through charge by-pass pilot 264 and charge by-pass valve 262, and into "low pressure" conduit 215.

Generally, as shown by the appropriate arrowed lines associated with the fluid flow in FIGS. 2A and 2B for "pumping" and "motoring", when the pump-motor unit 217 is in the pumping mode, the port A is the pressurized outlet port (see arrows in pump symbol in FIG. 2B), and when the unit is in the motoring mode, the port A is the pressurized inlet port and the port B is the exhaust outlet port.

At this point, the general operation of the hydraulic drive system during routine motoring, battery charging, and pumping will be summarized with respect to FIGS. 2A and 2B. The discussion that follows assumes that high pressure accumulator 138 is already charged beyond a certain minimum threshold pressure since a typical pumping operation is illustrated first.

Operation of hydraulic drive/charging system 102 can be suitably tailored to meet the continuously varying performance requirements of vehicle 100 and charging system 113. For example, if battery 111 is only partially charged, high pressure fluid from high pressure regulator 138 can be directed either to pump-motor 130 (operating as a motor with alternator clutch 209 engaged) or hydraulic motor 119 for purposes of operating alternator 115 to charge battery 111. If, on the other hand, it is desirable to provide additional power for accelerating vehicle 100, fluid from high pressure accumulator 138 can be directed to pump-motor 130 (operating as a motor with drive clutch 208 engaged), which converts the stored energy into rotational torque that can be transferred to drive-line 116 through gearing 210 and shaft 202. It shall be appreciated that the actual configuration and operation of hydraulic drive/charging system 102 can be varied depending on the particular configuration of the vehicle in which the system is incorporated, and to obtain a desired balance between vehicle performance and battery charging performance.

An example of one possible control strategy for operating hydraulic drive/charging system 102 when using transfer case 128 to power alternator 115 is summarized in the table shown in FIG. 4. As indicated in the table, this particular exemplary control strategy utilizes vehicle braking energy to recharge high pressure accumulator 138 when less than fully pressurized, regardless of the charge level of battery 111. Repressurization of high pressure accumulator 138 occurs while operating hydraulic drive/charging system 102 in the pumping mode. When the vehicle operator begins to perform a braking operation, which is represented in FIG. 3 with respect to the illustration of the vehicle brakes 302 and a corresponding brake sensor 304 showing the degree of requested braking in an analog format, one result is that drive clutch 208 is actuated using clutch valve 292 by way of solenoid 290, such that the pump-motor 130 is now clutched to drive-line system 116 (i.e., to intermediate drive shaft 202).

Once drive clutch 208 is applied, an appropriate command signal is provided by controller 140 to pumping solenoid 226 of swash control valve 222, displacing swash-plate 216 in a "negative" direction such that the rotation of intermediate drive-line 202 (with the vehicle moving in a forward direction) causes pump-motor unit 217 and charge pump 204 to pump pressurized fluid from port A to conduit 248. The fluid is pulled from low pressure reservoir 134 by way of conduit 268 and first passes through charge pump 204 before reaching port B of pump-motor 217 by way of "low pressure" conduit 270, where it enters the pump motor unit.

The displacement of swash-plate 216 (and therefore, the fluid output per rotation of drive-line 202) is typically proportional to the extent to which the vehicle operator depresses the brake pedal. It is known how to set the displacement of swash-plate 216 proportional to the brake torque applied by the operator, or to the displacement of the brake pedal, and therefore further discussion of the displacement of swash-plate 216 is not necessary herein.

With charge pump 204 and pump-motor unit 217 operating in the pumping mode, pressurized fluid communicated through conduit 248 unseats a poppet member in mode control valve 232, such that the pressurized fluid flows into conduit 223, and thereby pressurizes high pressure accumulator 138. At the same time, conduit 260 is also charged with the pressurized fluid, but the fluid flow does not take place along this conduit.

At the completion of the deceleration portion of the braking cycle (pumping mode), the vehicle operator may release brake pedal 302, causing hydraulic drive/charging system 102 to exit the pumping mode. The above process is repeated continuously during a vehicle braking cycle so long as high pressure accumulator 138 is less than fully pressurized.

Continuing to refer to the table in FIG. 4, operation of hydraulic drive/charging system 102 during a braking cycle will vary depending on the charge level of battery 111 when high pressure accumulator 138 is generally fully charged. In instances where high pressure accumulator 138 is generally fully pressurized and battery 111 is less than fully charged, braking energy absorbed by hydraulic drive/charging system 102 during a vehicle braking cycle can be utilized to power alternator 115 for charging battery 111, rather than further pressurizing high pressure accumulator 138. This is accomplished by transferring torque from driveshaft 116 directly to alternator 115 through gearing 210 and 227 in transfer case 128. This variation of the battery charge mode can be initiated by controller 140 activating both drive clutch 208 and alternator clutch 209. This allows torque in shaft 202 to be transferred through gears 210 and 227 to shaft 211 connected to alternator 115. To avoid performing unnecessary work on fluid present in hydraulic drive/charging system 102, pump-motor unit 217 can be set to its neutral condition. Drive clutch 208 and alternator clutch 209 are deactivated at the end of the braking cycle.

One factor that may affect operation of hydraulic drive/charging system 102 when not operating in the braking mode is vehicle acceleration. Torque requirements of vehicle 100 during acceleration can be a good indicator for determining the rate at which stored energy in hydraulic drive/charging system 102 is converted to mechanical energy for accelerating vehicle 100. Hydraulic drive/charging system 102 is capable of providing high torque at low speeds, which may be a challenge for other types of energy sources, such as electric motors and internal combustion engines. The torque from hydraulic drive/system 102 for powering vehicle 100 is immediately available at zero speed from hydraulic pressure generated during a braking event. Various acceleration conditions can be defined to describe the vehicle's varying torque requirements during acceleration. For purposes of discussion, three acceleration conditions, low torque acceleration, moderate torque acceleration and high torque acceleration, are identified in FIGS. 4 and 5. In practice, however, a different number of acceleration conditions may be defined depending on the particular application. Torque values for each defined acceleration condition can be assigned based on application and efficiency curves for hydraulic drive/charging system 102 versus power plant 112. Generally, activating the motoring mode during moderate and high torque acceleration would be desirable to utilize energy stored within hydraulic drive/charging system 102 for propelling vehicle 100. If, on the other hand, low torque were required, for example, due to a low torque demand from a vehicle operator, a low vehicle weight, or a downhill orientation of vehicle 100, power plant 112 may be able to efficiently accelerate vehicle 100 by itself, leaving hydraulic drive/charging system 102 available to transfer stored hydraulic energy to battery 111, thus emptying high pressure accumulator 138 prior to the next braking cycle. This energy transfer could take place throughout the low torque acceleration condition, for example, as well as when operating vehicle 100 at a steady speed (for example while coasting).

With continued reference to the table in FIG. 4, when vehicle 100 is operating at a condition other than braking, such as accelerating, coasting, or when at a stop, hydraulic drive/charging system 102 will be turned off when a pressure within high pressure accumulator 138 drops below a certain level. This condition is indicated by proximity switch 284 generating a signal indicating the closing of accumulator 280, whereby the flow of pressurized fluid from accumulator 138 is prohibited. On the other hand, if a pressure within high pressure accumulator 138 is above the minimum level, operation of hydraulic drive/charging system 102 will be dependent on the charge level of battery 111. If, for example, battery 11 is partially charged and vehicle 100 is being operated under low torque acceleration, constant speed, coasting, or at stop, the battery charge mode of hydraulic drive/charging system 102 will be activated.

In the battery charge mode, swash-plate 216 is disposed at an angular inclination opposite that which existed when the unit was in the pumping mode (i.e., the swash-plate 216 goes "over-center" to a positive angular inclination). When pump-motor unit 217 is in the battery charge mode, swash-plate 216 is displaced such that flow through pump-motor unit 217 (from port A to port B) will cause the pump-motor unit to transmit torque to alternator shaft 211. By way of example only, the swash control valve 222 is constructed such that pressurized fluid can always flow from conduit 248 to conduit 223 (i.e., the pumping mode). However, only when mode pilot valve 236 receives an appropriate input signal to its solenoid is there an appropriate pilot signal to solenoid 238. The pilot signal assists in the opening of the poppet member of mode valve 232 to permit relatively unrestricted flow of high pressure fluid from high pressure accumulator 138 through the conduits 223, and then through conduit 248 to the port A (inlet port in motoring mode) of the pump-motor unit 217.

Energy stored within the high pressure fluid is transferred through pump-motor unit 217 to rotating shaft 206. The energy is transferred mechanically through gearing 227 to alternator shaft 211 when alternator clutch 209 is applied. The energy is then transferred to alternator 115 for charging battery 111.

The "low pressure" fluid exits pump-motor unit at port B into conduit 270. It then passes through charge by-pass valve assembly 262, which has been opened as opposed to its state during pumping, and into conduit 215, where it then goes through filter assembly 136 and into low pressure reservoir 134.

With further reference to the table in FIG. 4, if battery 111 is partially charged and vehicle 100 is operated under either moderate or high torque acceleration, the battery charge mode is deactivated and the motoring mode is activated. In the motoring mode, swash-plate 216 is disposed at an angular inclination opposite that which existed when the unit was in the pumping mode (i.e., the swash-plate 216 goes "overcenter" to a positive angular inclination). When pump-motor unit 217 is in the motoring mode, swash-plate 216 is displaced such that flow through the pump-motor unit 217 (from port A to port B) will cause pump-motor unit to transmit torque to drive-line shaft 202, tending to drive intermediate shaft 202 of drive-line system 110 in a direction corresponding to the same forward movement in which the vehicle is already engaged. By way of example only, swash control valve 222 is constructed such that pressurized fluid can always flow from the conduit 248 to conduit 223 (i.e., the pumping mode). However, only when mode pilot valve 236 receives an appropriate input signal to its solenoid is there an appropriate pilot signal to solenoid 238. The pilot signal assists in the opening of the poppet member of mode valve 232 to permit relatively unrestricted flow of high pressure fluid from high pressure accumulator 138 through conduit 223, and then through conduit 248 to the port A (inlet port in motoring mode) of pump-motor unit 217.

Energy stored within the high pressure fluid is transferred through pump-motor unit 217 to rotating shaft 206. The energy is transferred mechanically through gearing 210 and to intermediate shaft 202 when drive clutch 208 is applied. The energy is then transferred along drive-line system 110 to wheels 104.

Continuing to refer to the table of FIG. 4, accelerating vehicle 100 or operating it at a constant speed with a fully charged battery 111 and a fully pressurized high pressure accumulator 138 causes controller 140 to activate the motoring mode to transfer stored energy to drive system 110 for propelling the vehicle. Operation of hydraulic drive/charging system 102 in the motoring mode proceeds as previously described, and thus no further elaboration is required. The motoring mode is deactivated when vehicle 100 ceases accelerating or is no longer operating at a constant speed.

An example of a possible control strategy for operating hydraulic drive/charging system 102 when using hydraulic motor 119 to power alternator 115 is summarized in the table shown in FIG. 5. As indicated in the table, this exemplary control strategy also utilizes vehicle braking energy to recharge high pressure accumulator 138 when less than fully pressurized, regardless of the charge level of battery 111. Repressurizing high pressure accumulator 138 entails operating hydraulic drive/charging system 102 in the pumping mode in the manner previously described above with respect to the control strategy summarized in FIG. 5. At the completion of the deceleration portion of the braking cycle (pumping mode), the vehicle operator may release the brake pedal 302, causing the hydraulic drive/charging system to exit the pumping mode. The above process is repeated continuously during a vehicle braking cycle so long as the high pressure accumulator is less than fully pressurize.

Continuing to refer to the table in FIG. 5, operation of hydraulic drive/charging system 102 during a braking cycle may vary depending on the charge level of battery 111 when high pressure accumulator 138 is generally fully pressurized. In instances where high pressure accumulator 138 is generally fully pressurized and battery 111 is less than fully charged, energy absorbed by hydraulic drive/charging system 102 during a vehicle braking cycle can be utilized to power alternator 115 for charging battery 111, rather than further pressurizing high pressure accumulator 138. This is accomplished by controller 140 activating the pumping mode in the manner previously described above, but instead of directing the high pressure fluid from pump-motor unit 217 to high pressure accumulator 138, controller 140 causes solenoid 241 to position control valve 239 so as to transfer the high pressure fluid to hydraulic motor 119 through conduit 235. Rotational torque produced by hydraulic motor 119 is used to power alternator 115 for charging battery 111. The pumping mode terminates at the end of the braking cycle.

With continued reference to the table in FIG. 5, when vehicle 100 is operating in a condition other than braking, such as accelerating, coasting, or when at a stop, hydraulic drive/charging system 102 will be turned off when the pressure within high pressure accumulator 138 drops below a certain level. As described previously, this condition is indicated by proximity switch 284 generating a signal indicating the closing of accumulator 280, whereby the flow of pressurized fluid from accumulator 138 is prohibited. If, on the other hand, pressure within high pressure accumulator 138 is above the minimum level, operation of hydraulic drive/charging system 102 will be dependant on the charge level of battery 111. For example, if battery 111 is partially charged and vehicle 100 is operating under low torque acceleration, constant speed, coasting, or at stop, the battery charge mode will be activated.

In the battery charge mode, solenoid 241 adjusts control valve 239 to direct high pressure fluid from high pressure accumulator 138 through conduit 235 to hydraulic motor 119. Rotational torque produced by hydraulic motor 119 is transferred through alternator shaft 229 to alternator 115 for charging battery 111. The "low pressure" fluid exits hydraulic motor 119 into conduit 237. The fluid then passes through conduit 270 and charge by-pass valve assembly 262, which has been opened as opposed to its state during pumping, and into conduit 215, where it then passes through filter assembly 136 and into low pressure reservoir 134.

With further reference to the table in FIG. 5, if battery 111 is partially charged and vehicle 100 is operated under either moderate or high torque acceleration, the battery charge mode is deactivated and the motoring mode is activated in the same manner as discussed above with respect to FIG. 4. Operating in the motoring mode will cause pump-motor unit 217 to transmit torque to drive-line shaft 202, tending to drive intermediate shaft 202 of drive-line system 110 in a direction corresponding to the same forward movement in which the vehicle is already engaged. Energy stored within the high pressure fluid is transferred through pump-motor unit 217 to rotating shaft 206. The energy is transferred mechanically through gearing 210 and to intermediate shaft 202 when drive clutch 208 is applied. The energy is then transferred along drive-line system 110 to wheels 104.

Continuing to refer to the table of FIG. 5, accelerating vehicle 100 or operating the vehicle at a constant speed when battery 111 is fully charged and high pressure accumulator 138 is fully pressurized causes controller 140 to activate the motoring mode to transfer energy stored within hydraulic drive/charging system 102 to drive system 110 for propelling the vehicle. Operation of hydraulic drive/charging system 102 in the motoring mode is implemented in the manner as described above with respect to FIG. 4. Energy stored within the high pressure fluid is transferred through pump-motor unit 217 to rotating shaft 206. The energy is mechanically transferred through gearing 210 to intermediate shaft 202 when drive clutch 208 is applied. The energy is then transferred along drive-line system 110 to wheels 104. The motoring mode is deactivated when vehicle 100 ceases accelerating or is no longer operating at a constant speed.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A hydraulic system for storing and releasing hydraulic fluid comprising:
    a high pressure storage device;
    a low pressure storage device;
    a pump for converting between mechanical energy and hydraulic energy, the pump fluidly connected to the high pressure storage device and the low pressure storage device;
    a motor for converting between hydraulic energy and mechanical energy, the motor fluidly connected to the high pressure storage device and the low pressure storage device;
    a first selectively rotating shaft associated with mechanical energy and operably connected to the motor,
    a second selectively rotating shaft associated with mechanical energy; and
    a clutch for selectively connecting the second shaft to the pump, the clutch is operable to decouple the second selectively rotating shaft from the pump when the control valve is adjusted to fluidly connect the high pressure storage device to the motor; and
    a control valve having a first port fluidly connected to the high pressure storage device, a second port fluidly connected to the pump, and a third port fluidly connected to the motor, the control valve operable for selectively distributing high pressure fluid between the pump, motor and high pressure storage device.

2. The hydraulic system of claim 1, wherein the clutch is operable to couple the second selectively rotating shaft to the pump when the control valve is adjusted to fluidly connect the pump to the high pressure storage device.

3. The hydraulic system of claim 1, wherein the first selectively rotating shaft is operably connectable to an electric current producing device, and the second selectively rotating shaft is operably connectible to a vehicle drivetrain.

4. The hydraulic system of claim 1, wherein the clutch is operable to couple the second selectively rotating shaft to the pump when the control valve is adjusted to fluidly connect the pump to the motor.

5. The hydraulic system of claim 4, wherein both the pump and the motor are fluidly disconnected from the high pressure storage device when the valve is adjusted to fluidly connect the pump to the motor.

6. The hydraulic system of claim 1, wherein the motor is fluidly disconnected from the high pressure storage device when the control valve is adjusted to fluidly connect the pump to the high pressure storage device.

7. The hydraulic system of claim 1, wherein the pump is fluidly disconnected from the high pressure storage device when the control valve is adjusted to fluidly connect the motor to the high pressure storage device.

8. The hydraulic system of claim 1, wherein the pump is operable as a motor for converting hydraulic energy to mechanical energy.

9. The hydraulic system of claim 1, wherein the control valve is adjustable between a first position in which the high pressure storage device is ported to the motor, a second closed position generally blocking flow of hydraulic fluid between the high pressure storage device, the pump and the motor, a third position in which the pump is ported to the high pressure storage device, and a fourth position in which the pump is ported to the motor.

10. A hydraulic system for storing and releasing hydraulic fluid comprising:
    a high pressure storage device;
    a low pressure storage device;
    a hydraulic device for converting between hydraulic energy and mechanical energy, the hydraulic device fluidly connected to the high pressure storage device and the low pressure storage device;
    at least one shaft operably connectible to an electric current producing device;
    at least one clutch for selectively distributing mechanical energy between the hydraulic device and the at least one shaft; and
    wherein the at least one shaft comprises a first selectively rotating shaft associated with mechanical energy and a second rotating shaft associated with mechanical energy, and the at least one clutch comprises a first clutch for selectively engaging the first selectively rotating shaft with the hydraulic device, and a second clutch for selectively engaging the second shaft with the hydraulic device.

11. The hydraulic system of claim 10, wherein the first clutch and the second clutch are generally simultaneously engageable for transferring mechanical energy from the first selectively rotating shaft to the second rotating shaft.

12. The hydraulic system of claim 11, wherein the hydraulic device is operable in a neutral condition when both the first clutch and the second clutch are engaged.

13. The hydraulic system of claim 10, wherein the first selectively rotating shaft is connectable to a vehicle drivetrain and the second selectively rotating shaft is connectable to the electric current producing device.

14. A method associated with a vehicle hydraulic drive system having a high pressure storage device, at least one hydraulic device for converting between hydraulic energy and mechanical energy, a first selectively rotating shaft engageable with a vehicle drivetrain, and a second selectively rotating shaft engageable with an electric current producing device, comprising the steps of:
   detecting an operating condition of the vehicle;
   detecting the charge level of a battery;
   detecting the pressure level of the high pressure storage device;
   activating one of a pumping mode, motoring mode, and battery charge mode in response to the sensed operating condition and battery charge level, and
   selectively activating the battery charge mode during a vehicle braking cycle when the pressure level within the high pressure storage device is above a threshold pressure.

15. The method of claim 14, further comprising the step of selectively activating the battery charge mode when operating the vehicle at substantially a constant speed and the high pressure storage device is at least partially pressurized.

16. The method of claim 14, further comprising the step of selectively activating the battery charge mode when operating the vehicle while coasting and at a stop and the high pressure storage device is at least partially pressurized and a charge level of the battery is less than a threshold charge level.

17. The method of claim 14, further comprising the step of selectively activating the motoring mode when operating the vehicle at substantially a constant speed and a charge level of the battery is above a threshold charge level and the high pressure storage device is at least partially pressurized.

18. The method of claim 14, wherein the step of activating the battery charge mode comprises coupling the second selectively rotating shaft to the hydraulic device.

19. The method of claim 14, wherein the step of activating the battery charge mode comprises coupling the first selectively rotating shaft to the second selectively rotating shaft.

20. The method of claim 14, wherein the step of activating the battery charge mode comprises fluidly connecting the hydraulic device to the high pressure storage device such that fluid flows from the high pressure storage device to the hydraulic device.

* * * * *